United States Patent [19]

Kojima

[11] Patent Number: 5,038,312

[45] Date of Patent: Aug. 6, 1991

[54] DATA PROCESSING SYSTEM CAPABLE OF PERFORMING VECTOR/MATRIX PROCESSING AND ARITHMETIC PROCESSING UNIT INCORPORATED THEREIN

[75] Inventor: Shingo Kojima, Tokyo, Japan

[73] Assignee: NEC Corporation, Tokyo, Japan

[21] Appl. No.: 435,908

[22] Filed: Nov. 14, 1989

[30] Foreign Application Priority Data

Nov. 14, 1988 [JP] Japan .................................. 63-288586

[51] Int. Cl.⁵ ............................................ G06F 7/38
[52] U.S. Cl. ..................................... 364/736; 364/730
[58] Field of Search ................ 364/736, 748, 754, 730

[56] References Cited

U.S. PATENT DOCUMENTS

| | | | |
|---|---|---|---|
| 4,608,634 | 8/1986 | Candel et al. | 364/200 |
| 4,760,517 | 7/1988 | Miller et al. | 364/200 |
| 4,761,753 | 8/1988 | Izumisawa | 364/736 |
| 4,811,267 | 3/1989 | Ando et al. | 364/736 |
| 4,823,258 | 4/1989 | Yamazaki | 364/200 |
| 4,901,267 | 2/1990 | Birman et al. | 364/736 |
| 4,942,547 | 7/1990 | Joyce et al. | 364/748 |

Primary Examiner—Gary V. Harkcom
Assistant Examiner—Tan V. Mai
Attorney, Agent, or Firm—Sughrue, Mion, Zinn Macpeak & Seas

[57] ABSTRACT

An arithmetic processing unit which speeds up arithmetic operations performed up on vectors, matrices or a vector and a matrix, and is coupled to a central processing unit. The arithmetic unit includes a program memory for storing a microprogram corresponding to a macro-instruction code fed from the central processing unit, wherein each macro-instruction is representative of an arithmetic operation. Within the arithmetic unit, operand codes are transferred from an internal register array to operand registers assigned to an augend and an addend, or a multiplicand and a multiplier for calculations carried out by an arithmetic and logic unit. The operand codes for the arithmetic operation are successively transferred to the internal register array prior to the execution of the macro-instruction codes, so that the arithmetic processing unit completes each task without the need for interruptions to receive operands.

6 Claims, 13 Drawing Sheets

$$\begin{pmatrix} x' \\ y' \\ z' \end{pmatrix} = \underbrace{\begin{pmatrix} a & b & c \\ d & e & f \\ g & h & i \end{pmatrix}}_{3 \times 3 \text{ MATRIX}} \cdot \underbrace{\begin{pmatrix} x \\ y \\ z \end{pmatrix}}_{\text{VECTOR}}$$

$$\Downarrow$$

$$\left. \begin{array}{l} x' = ax + by + cz \\ y' = dx + ey + fz \\ z' = gx + hy + iz \end{array} \right\} \text{ARITHMETIC OPERATIONS}$$

FIG. 2
PRIOR ART

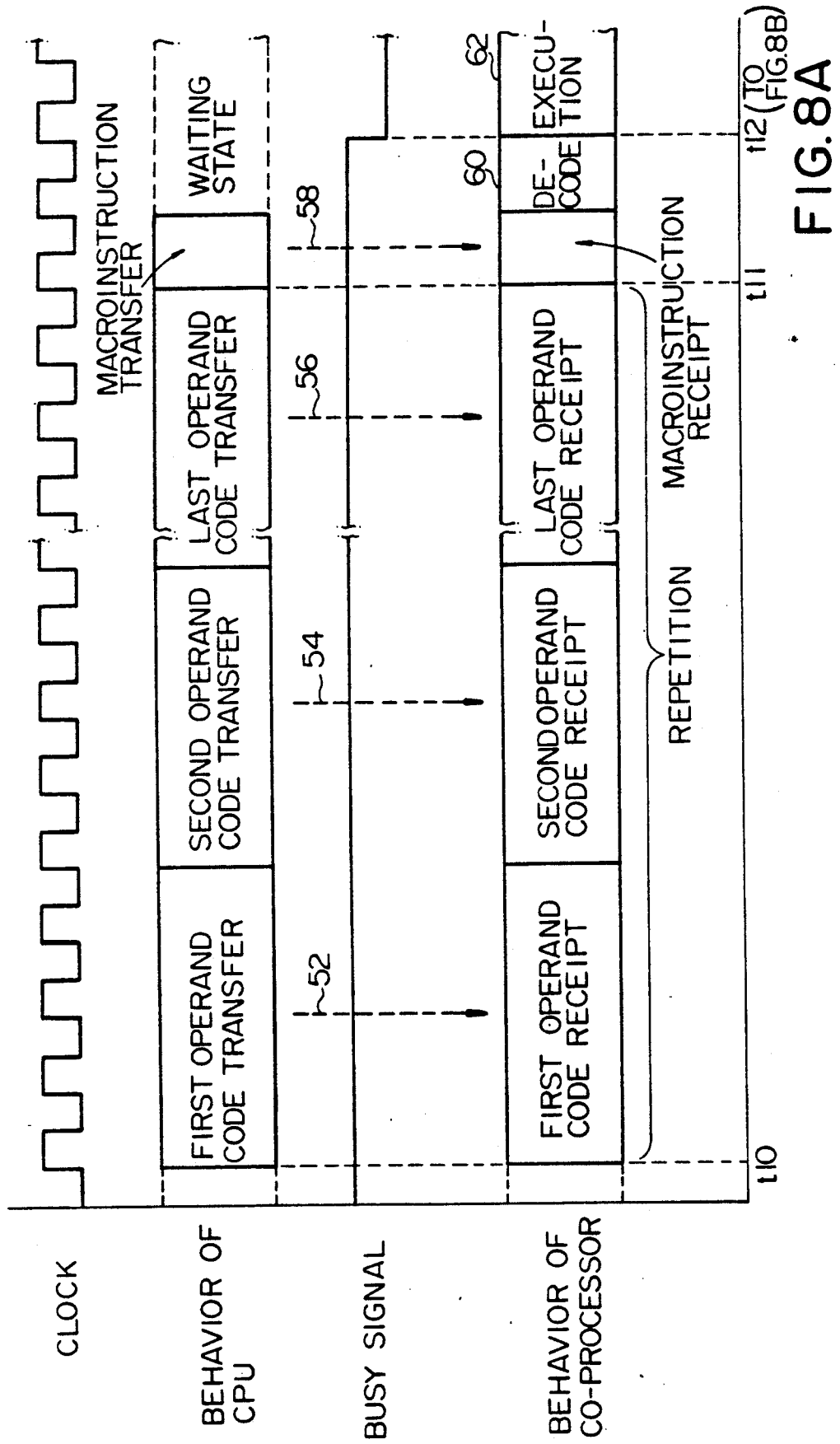

| REGISTOR 142 | TO SHIFTER 148 | TO SHIFTER 150 | TO SUBTRACTER 156 |
|---|---|---|---|
| 1x. xxx xxxx xxxx xxxx xxxx xxxx | 1 | 00H | 1FFH |
| 01. xxx xxxx xxxx xxxx xxxx xxxx | 0 | 00H | 000H |
| 00. 1xx xxxx xxxx xxxx xxxx xxxx | 0 | 01H | 001H |
| 00. 1xx xxxx xxxx xxxx xxxx xxxx | 0 | 01H | 001H |
| 00. 01x xxxx xxxx xxxx xxxx xxxx | 0 | 02H | 002H |
| 00. 001 xxxx xxxx xxxx xxxx xxxx | 0 | 03H | 003H |
| 00. 000 1xxx xxxx xxxx xxxx xxxx | 0 | 04H | 004H |
| 00. 000 01xx xxxx xxxx xxxx xxxx | 0 | 05H | 005H |
| 00. 000 001x xxxx xxxx xxxx xxxx | 0 | 06H | 006H |
| 00. 000 0001 xxxx xxxx xxxx xxxx | 0 | 07H | 007H |
| 00. 000 0000 1xxx xxxx xxxx xxxx | 0 | 08H | 008H |
| 00. 000 0000 01xx xxxx xxxx xxxx | 0 | 09H | 009H |
| 00. 000 0000 001x xxxx xxxx xxxx | 0 | 0AH | 00AH |
| 00. 000 0000 0001 xxxx xxxx xxxx | 0 | 0BH | 00BH |
| 00. 000 0000 0000 1xxx xxxx xxxx | 0 | 0CH | 00CH |
| 00. 000 0000 0000 1xxx xxxx xxxx | 0 | 0CH | 00CH |
| 00. 000 0000 0000 1xxx xxxx xxxx | 0 | 0CH | 00CH |
| 00. 000 0000 0000 01xx xxxx xxxx | 0 | 0DH | 00DH |
| 00. 000 0000 0000 0010 xxxx xxxx | 0 | 0EH | 00EH |
| 00. 000 0000 0000 0001 xxxx xxxx | 0 | 0FH | 00FH |
| 00. 000 0000 0000 0000 1xxx xxxx | 0 | 10H | 010H |
| 00. 000 0000 0000 0000 01xx xxxx | 0 | 11H | 011H |
| 00. 000 0000 0000 0000 001x xxxx | 0 | 12H | 012H |
| 00. 000 0000 0000 0000 0001 xxxx | 0 | 13H | 013H |
| 00. 000 0000 0000 0000 0000 1xxx | 0 | 14H | 014H |
| 00. 000 0000 0000 0000 0000 01xx | 0 | 15H | 015H |
| 00. 000 0000 0000 0000 0000 0010 | 0 | 16H | 016H |
| 00. 000 0000 0000 0000 0000 0001 | 0 | 17H | 017H |
| 00. 000 0000 0000 0000 0000 0000 | 0 | 00H | 000H |

FIG. 11

| BIT PATTERN OF SECTION | VALUE OF MULTIPLE | SELECTED REGISTOR |
|---|---|---|
| 0 0 0 | 0 | NONE (or "O") |
| 0 0 1 | +2 | 214 |
| 0 1 0 | +2 | 214 |
| 0 1 1 | +4 | 212 |
| 1 0 0 | −4 | 216 |
| 1 0 1 | −2 | 218 |
| 1 1 0 | −2 | 218 |
| 1 1 1 | 0 | NONE (or "O") |

FIG.13

DATA PROCESSING SYSTEM CAPABLE OF PERFORMING VECTOR/MATRIX PROCESSING AND ARITHMETIC PROCESSING UNIT INCORPORATED THEREIN

FIELD OF THE INVENTION

This invention relates to a data processing system and, more particularly, to a slave arithmetic processing unit associated with a central processing unit incorporated in the data processing system for carrying out various vector processing.

DESCRIPTION OF THE RELATED ART

A prior art slave arithmetic processing unit of the data processing system is responsive to scalar arithmetic instructions for the four fundamental arithmetic operations and transcendental integral functions, however, no instruction set is provided therein for various vector operations or matrices where the data processing system fetches more than three operands. If an user needs to carry out a vector calculation such as a vector addition or a matrix calculation with the prior art data processing system, the vectors or the matrices are loaded into a memory space or internal register of the processing unit assigned to the user, and the processing unit repeats executions of an adding and multiplying instructions of the assembly instruction set.

For example, let us consider a prior art data processing system where a central processing unit without any capability of the arithmetic operations and a slave arithmetic processing unit associated with the central processing unit are incorporated. The slave processor fetches instruction codes from the central processing unit, and, then, executes the instruction instead of the central processing unit. The slave processing unit thus associated with the central processing unit looks like imparting the capability thereof to the central processing unit, and, for this reason, the slave processing unit is called as "co-proccessing unit" in terms of the central processing unit.

The executive sequence of the co-processing unit is, by way of example, illustrated in FIG. 1 of the drawings. The central processing unit transfers an arithmetic instruction code for requesting an assistance to the co-processing unit at time t1. With the arithmetic instruction, the co-processing unit shifts a busy signal to an active low level representative of the necessity of the waiting status of the central processing unit. While the busy signal remains in the active low level, the central processing unit is established into the waiting status. The coprocessing unit decodes the arithmetic instruction code fed from the central processing unit at time t2, and starts on the execution of the arithmetic instruction at time t3. Upon completion of the arithmetic operation, the co-processing unit allows the busy signal to be recovered to an inactive high level at time t4, and, then, the central processing unit reads out the status from the co-processing unit. The central processing unit analyses the status fed from the co-processing unit at time t5, and proceeds to a new task if no exception takes place. Thus, the central processing unit needs to communicate with the co-processing unit over four clocks, i.e., the instruction code transfer, the instruction code decoding, the status transfer and the status analysis. If the data processing system is requested to produce a product array (x', y', z') from a 3×3 matrix (a, b, c, d, e, f, h, i) and a vector with three elements (x, y, z), the central processing unit needs to instruct the co-processing unit on nine multiplying operations and six adding operations as shown in FIG. 2. Since each adding operation and each multiplying operation correspond to a single adding instruction code and a single multiplying instruction code, respectively, fifteen arithmetic instruction codes are repeatedly supplied from the central processing unit to the co-processing unit for completion of the given calculation. Assuming now that the co-processing unit consumes fifteen clocks for each execution of the multiplying instruction code and twelve clocks for each execution of the adding instruction code (each including four clocks for the communication described hereinbefore), the data processing unit consumes two-hundreds and seven clocks for the given task.

Thus, the prior art data processing system consumes a large amount of time period for the vector operation and the matrix operation due to the repetition of the adding and multiplying operations as well as the communication between the central processing unit and the co-processing unit.

SUMMARY OF THE INVENTION

It is therefore an important object of the present invention to provide a data processing system which executes vector and matrix operations in a relatively small amount of time.

It is also an important object of the present invention to provide a co-processing unit which carries out arithmetic operations on vectors and matrices in response to vector and matrix arithmetic instructions.

To accomplish these objects, the present invention proposes to provide microprograms representative of arithmetic operations on vectors, a vector and matrix, and matrices in a program memory incorporated in an arithmetic processing unit.

In accordance with one aspect of the present invention, there is provided an arithmetic processing unit provided in association with a central processing unit having a plurality of instruction codes including a plurality of macro-instruction codes respectively representative of arithmetic operations on scalar numbers, on a vector and a matrix, on a plurality of vectors and on a plurality of matrices, comprising: a) a program memory unit storing a plurality of microprograms including microprograms corresponding to the macro-instructions representative of the arithmetic operations; b) an instruction decoder unit supplied with one of the macro-instruction codes and producing a decoded signal indicative of a starting address of one of the microprograms corresponding to aforesaid one of the macro-instructions for successively reading out a micro-instruction code sequence from the program memory; c) a controlling unit responsive to the micro-instruction code sequence and operative to produce a plurality of controlling signals and to shift a busy signal between an active level and an inactive level so as to cause the central processing unit to enter a waiting state and to be recovered therefrom; d) an internal register array having a plurality of registers for memorizing a plurality of operand codes, sums, products and product-sums; e) a resultant register for storing one of the sum of the operand codes, one of the product of the operand codes and one of the product-sums; f) a plurality of operand registers partially assigned to the operand codes serving as an augend and an addend and partially assigned to the operand codes serving as a multiplicand and a multiplier; g) an arithmetic and logic unit responsive to the controlling signals and operative to perform at least arithmetic operations on the operand codes in the operand registers for producing one of the sums, one of the products and one of the product-sums in the resultant register; and h) a data input-and-output port communicable with external units including the central processing unit for receiving the operand codes and for transferring one of the sums, one of the products and the product-sums.

In accordance with another aspect of the present invention, there is provided a data processing system comprising a) a central processing unit having a plurality of instruction codes including a plurality of macro-instruction codes respectively representative of arithmetic operations on scalar numbers, on a vector and a matrix, on a plurality of vectors and on a plurality of matrices, the central processing unit further having a plurality of operand codes and macro-instructions for requesting a successive receiving operation on the operands and successive transferring operation on at least product-sums; and b) an arithmetic processing unit comprising b-1) a program memory unit storing a plurality of microprograms including microprograms corresponding to the macro-instructions representative of the arithmetic operations and microprograms for the successive receiving operation and the successive transferring operation, b-2) an instruction decoder unit supplied with one of the macro-instruction codes and producing a decoded signal indicative of a starting address of one of the microprograms corresponding to aforesaid one of the macro-instructions for successively reading out a micro-instruction code sequence from the program memory, b-3) a controlling unit responsive to the micro-instruction code sequence and operative to produce a plurality of controlling signals and to shift a busy signal between an active level and an inactive level so as to cause the central processing unit to enter a waiting state and to be recovered therefrom, b-4) an internal register array having a plurality of registers for memorizing the operand codes, sums, products and the product-sums, b-5) a resultant register for storing one of the sums of the operand codes, one of the products of the operand codes and one of the product-sums, b-6) a plurality of operand registers partially assigned to the operand codes serving as an augend and an addend and partially assigned to the operand codes serving as a multiplicand and a multiplier, b-7) an arithmetic and logic unit responsive to the controlling signals and operative to perform at least arithmetic operations on the operand codes in the operand registers for producing aforesaid one of the sums, aforesaid one of the products and aforesaid one of the product-sums in the resultant register, and b-8) a data input-and-output port responsive to the controlling signals and communicable with the central processing unit for successively receiving the operand codes an for successively transferring the product-sums, the data input-and-output port further operative to transfer one of the sums and one of the products.

BRIEF DESCRIPTION OF THE DRAWINGS

The features and advantages of a data processing system and a co-processing unit according to the present invention will be more clearly understood from the following description taken in conjunction with the accompanying drawings in which:

FIG. 2 is a view showing the multiplication of a matrix and a vector calculated by the prior art data processing unit;

FIGS. 8A and 8B are timing charts showing the sequence of vector/matrix operation achieved by the data processing system according to the present invention;

FIG. 11 is a view showing the relationship between the bit string in the register 142 shown in FIG. 9 and the data bits fed to the shifters 148 and 150 and the subtracter 156;

FIG. 13 is a view showing the relationship between the bit pattern of each section and reference numeral designating the selected register.

DESCRIPTION OF THE PREFERRED EMBODIMENT

Figure 1:
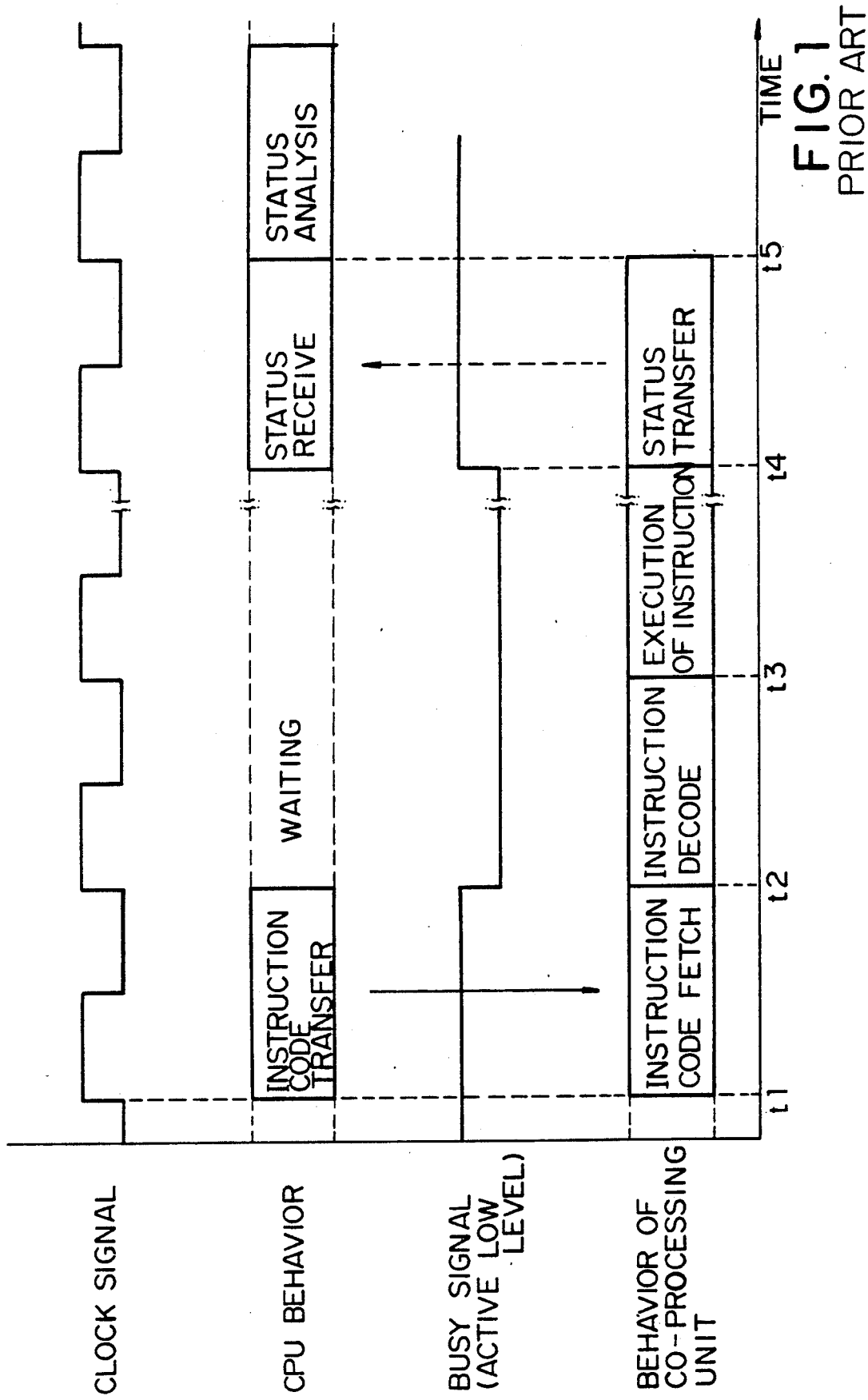
FIG. 1 is a timing chart showing the behavior of a prior art data processing system.
Figure 3:
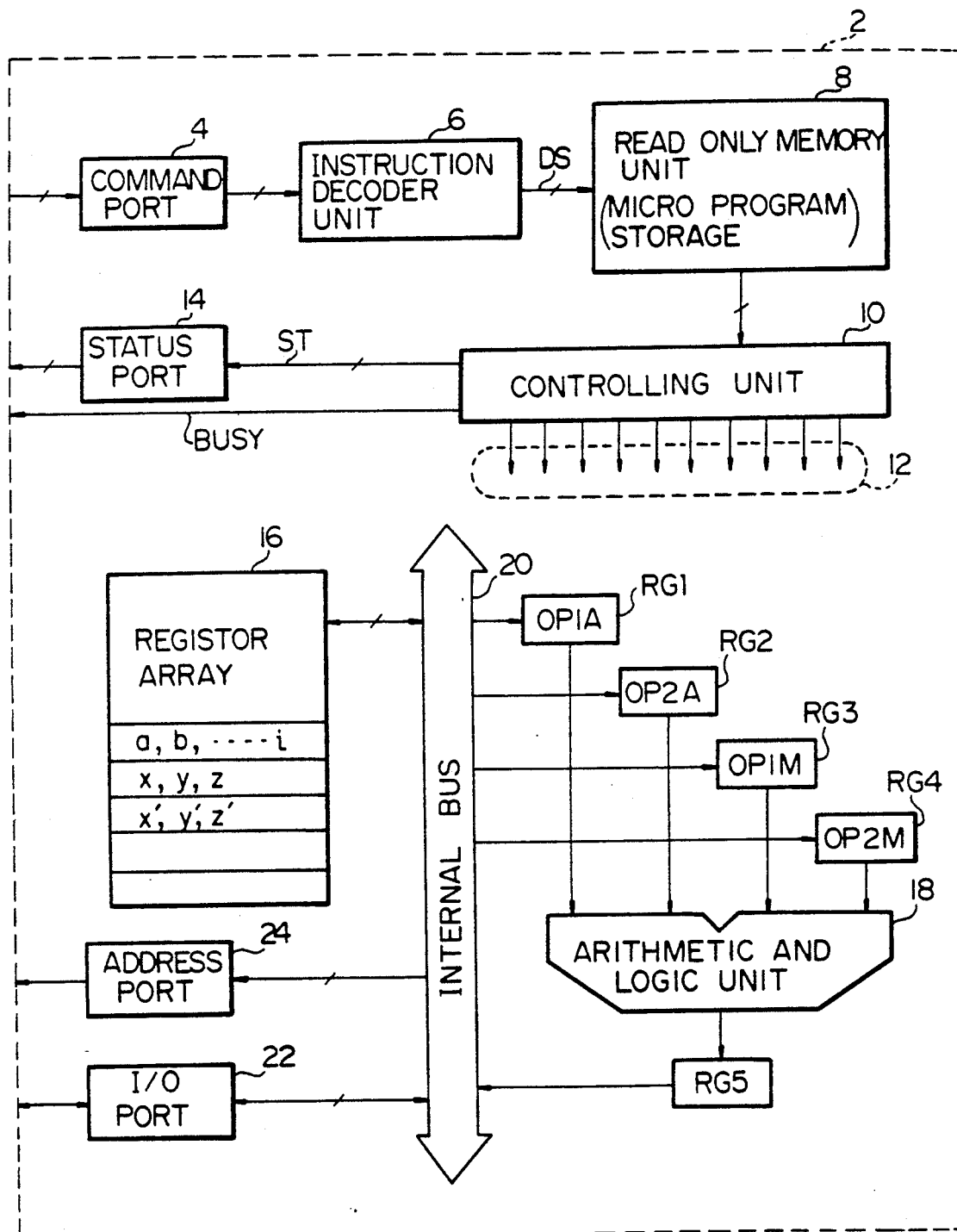
FIG. 3 is a block diagram showing the arrangement of an arithmetic processing unit embodying the present invention.

Referring first to FIG. 3 of the drawings, an arithmetic processing unit 2 embodying the present invention comprises a command port 4 for a macro-instruction code fed from a central processing unit 32 (shown in FIG. 4), and the macro-instruction code is transferred from the command port 4 to an instruction decoder unit 6. In a read only memory unit 8 are stored a plurality microprograms each read out therefrom in response to a decoded signal DS produced by the instruction decoder unit 6 for providing a micro-instruction stream to a controlling unit 10, and the controlling unit 10 produces various controlling signals 12 for achievement of each micro-instruction through selective activations of component units and circuits. The controlling unit 10 further produces a status code ST which is supplied from a status port 14 to the central processing unit 32 for reporting the actual status upon completion of a given task. The controlling unit 10 also produces a busy signal BUSY of an active low level which is fed to the central processing unit 32 for the sake of establishment of a waiting state. The microprograms include vector and matrix arithmetic microprograms as well as ordinary arithmetic microprograms for the four fundamental arithmetic operations, and, for this reason, the central processing unit 32 merely provides macro-instruction codes respectively representative of vector and matrix arithmetic operations.

The arithmetic processing unit 2 further comprises a register array 16, an arithmetic and logic unit 18 capable of executing at least an adding operation and a multiplying operation, four operand registers RG1, RG2, RG3 and RG4, and a resultant register RG5. The register array 16 is communicable with the operand registers RG1 to RG4 through an internal bus system 20, and the resultant register RG5 is also communicable with the register array 16 through the internal bus system 20. The register array 16 is constituted by a large number of registers including registers labeled with a to i, x, y, z, x', y' and z'. The internal bus system 20 is further coupled in parallel to a data input-and-output port 22 and an address port 24, and the arithmetic processing unit 2 is communicable with external devices through these ports 22 and 24.

Figure 4:
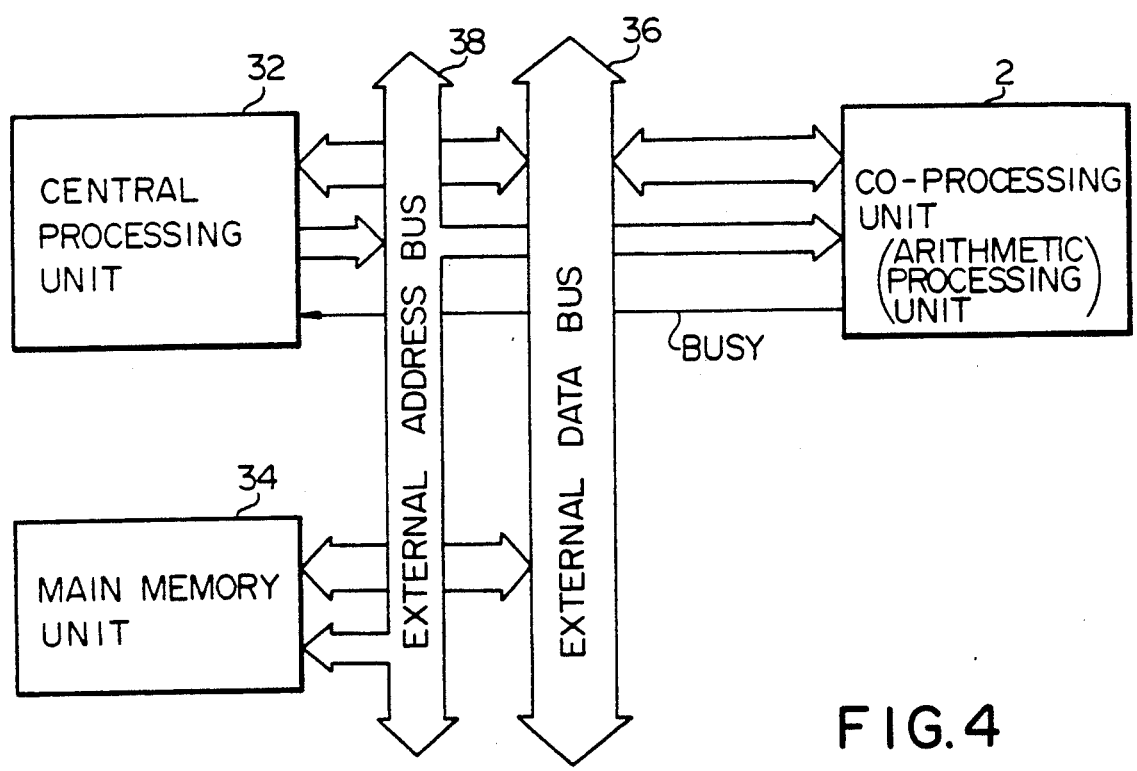
FIG. 4 is a block diagram showing the arrangement of a data processing system fabricated by using the arithmetic processing unit shown in FIG. 3.

The arithmetic processing unit 2 thus arranged forms a part of a data processing system together with the central processing unit 32, and serves as a co-processor for the central processing unit 32. As shown in FIG. 4 of the drawings, the central processing unit 32 and the arithmetic processing unit 2 are accessible to a main memory unit 34 through an external bus system provided with an external data bus 36 and an external address bus 38. The busy signal line BUSY is coupled to a control signal port of the central processing unit 32.

The behavior of the data processing system thus fabricated is described hereinbelow. First, assuming now that the data processing system is requested to carry out an adding operation on data codes a and b to produce the sum x, the central processing unit 32 supplies a macro-instruction code representative of the ordinary adding operation to the command port 4 of the arithmetic processing unit 2, and, then, the macro-instruction code is transferred to the instruction decoder unit 6 for decoding. The macro-instruction code is decoded by the decoder unit 6, and the decoded signal DS specifies the starting address of the micro-program for the ordinary adding operation. Then, a series of micro-instruction codes are sequentially read out from the read only memory unit 8.

In detail, the micro-instruction code sequence allows the controlling unit 10 to shift the busy signal BUSY into the active low level, and the busy signal is supplied to the controlling port of the central processing unit 32 through the busy signal line BUSY. With the busy signal, the central processing unit 32 enters the waiting state until the recovery of the busy signal.

Figure 5:
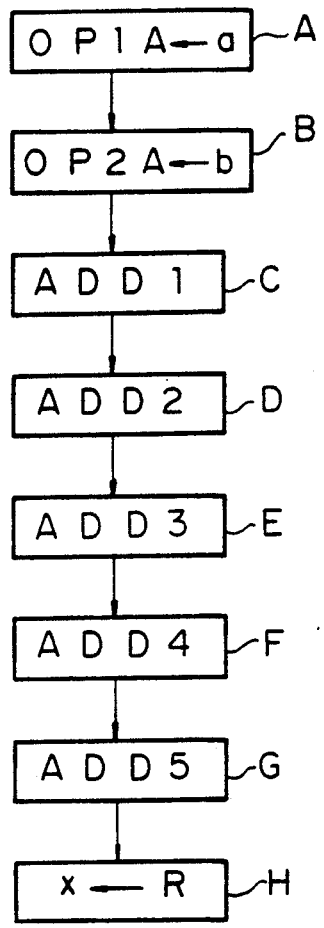
FIG. 5 is a flow chart showing a micro-instruction code sequence executed by the arithmetic processing unit shown in FIG. 3.

Subsequently, the central processing unit 32 provides the augend a and the addend b to the arithmetic processing unit 2. The augend a and the addend b are transferred from the data input-and-output port 22 through the internal bus system 20 to the register array 16, and are memorized into the registers a and b, respectively. When the augend and the addend are memorized in the internal register array 16, the augend a is supplied to the operand register RG1 as the first operand OP1A as by step A of FIG. 5, and the addend b is supplied to the operand register RG2 as the second operand as by step B of FIG. 5. When the two operands are thus stored in the operand registers RG1 and RG2, respectively, the arithmetic and logic unit 18 adds the addend b to the augend a as by steps C to G of FIG. 5 to produce the sum x in the resultant register RG5. The sum x is transferred to the register of the internal register array 16 as by step H of FIG. 5. The micro-instruction code sequence causes the busy signal BUSY to be recovered to the inactive high level, so that the central processing unit 32 fetches the status code indicative of any exception. If no exception takes place in the ordinary adding operation, the sum x is transferred to the central processing unit, and the data processing system confirms the completion of the given task. As will be seen from FIG. 5, the arithmetic processing unit consumes eight clocks for completion of the ordinary adding operation.

Figure 6:
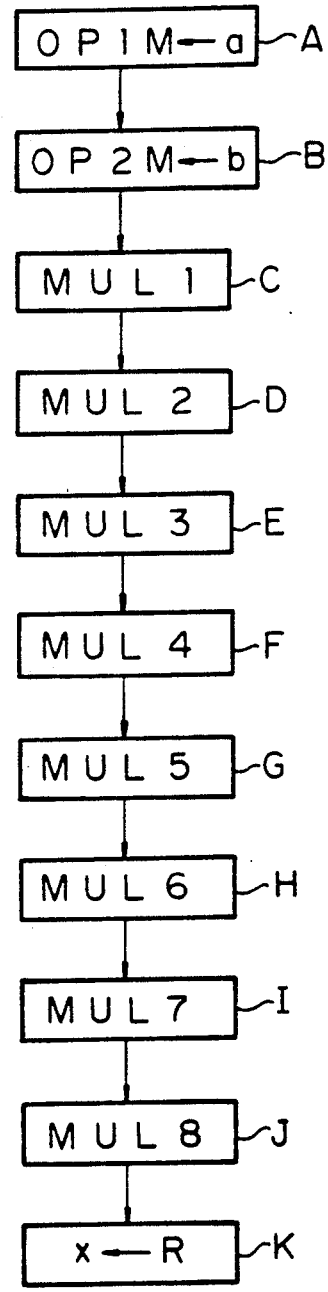
FIG. 6 is a flow chart showing another micro-instruction code sequence executed by the arithmetic processing unit shown in FIG. 3.

Next, description is made for an ordinary multiplying operation carried out by the data processing system with reference to FIG. 6. The central processing unit 32 supplies a macro-instruction code representative of the ordinary multiplying operation to the command port 4 of the arithmetic processing unit 2, and, then, the macro-instruction code is transferred to the instruction decoder unit 6 for decoding. The macro-instruction code is decoded by the decoder unit 6, and the decoded signal DS specifies the starting address of the microprogram for the ordinary multiplying operation. Then, a series of micro-instruction codes are sequentially read out from the read only memory unit 8.

In detail, the micro-instruction code sequence first allows the controlling unit 10 to shift the busy signal BUSY into the active low level, and the busy signal is supplied to the controlling port of the central processing unit 32 through the busy signal line BUSY. With the busy signal, the central processing unit 32 enters the waiting state until the recovery of the busy signal.

Subsequently, the central processing unit 32 provides the multiplicand a and the multiplier b to the arithmetic processing unit 2. The multiplicand a and the multiplier b are transferred from the data input-and-output port 22 through the internal bus system 20 to the register array 16, and are memorized into the registers a and b, respectively. When the multiplicand and the multiplier are memorized in the internal register array 16, the multiplicand a is transferred to the operand register RG3 as by step A of FIG. 6, and the multiplier b is transferred to the operand register RG4 as by step B of FIG. 6. If the two operands OP1M and OP2M are thus stored in the operand registers RG3 and RG4, respectively, the arithmetic and logic unit 18 multiplies a by b as by steps C to J of FIG. 6 to produce the product x. The product x is transferred from the resultant register RG5 to the register x of the internal register array 16. The micro-instruction code sequence then instructs the controlling unit 10 to recover the busy signal BUSY to the inactive high level which is reported to the controlling port of the central processing unit 32. Then, the central processing unit 32 requests the status code to the arithmetic processing unit 2, and the status code is analyzed by the central processing unit to see whether or not any exception takes place during the ordinary multiplying operation. If no exception is takes place, the product x is transferred to the central processing unit 32, and the data processing system confirms the completion of the given task. In the ordinary multiplying operation, the arithmetic processing unit 2 consumes eleven clocks as will be seen from FIG. 6.

Figure 7:
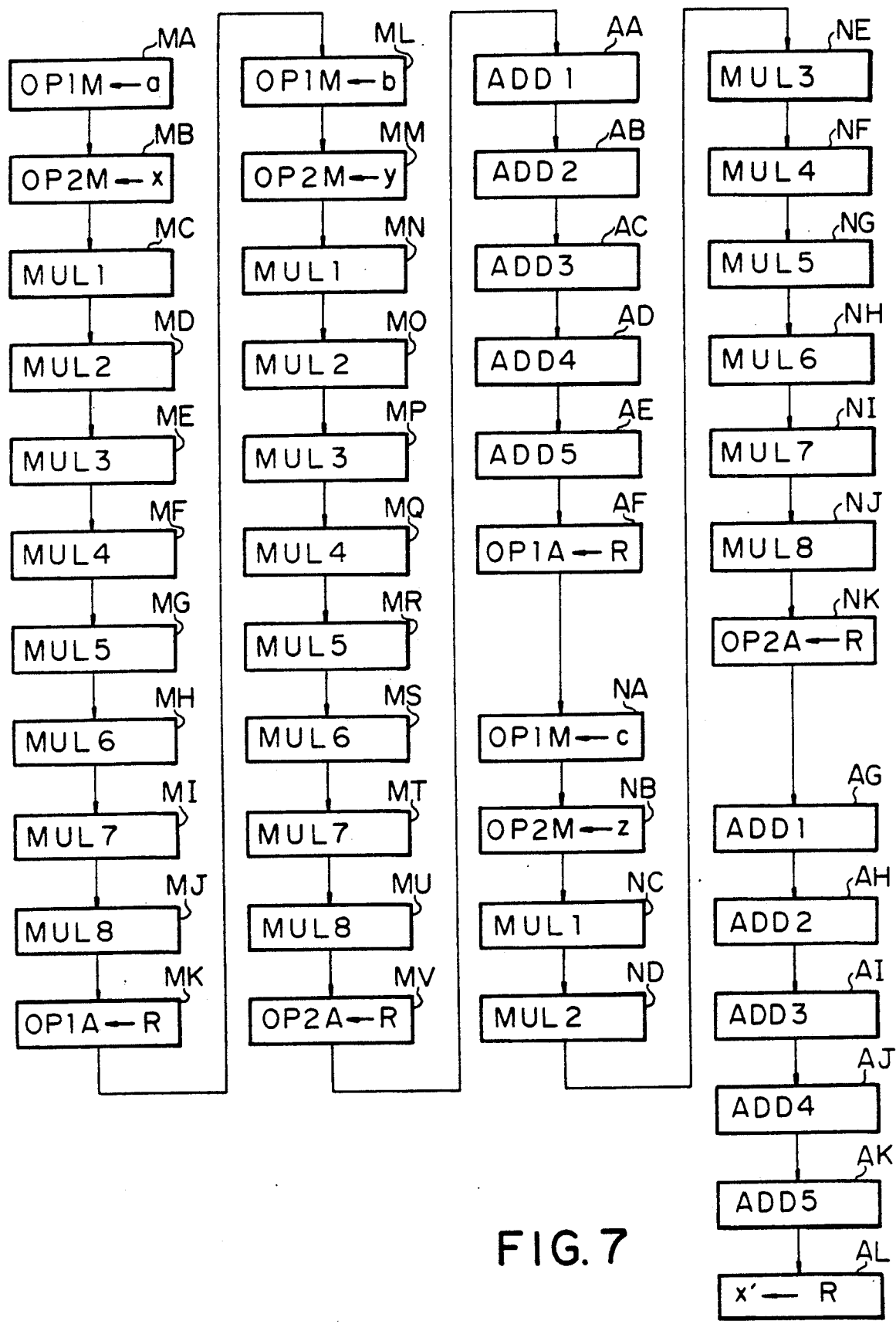
FIG. 7 is a flow chart showing still another micro-instruction code sequence for the vector/matrix operation executed by the arithmetic processing unit shown in FIG. 3.

Finally, description is made for a vector/matrix arithmetic operation with reference to FIG. 7 of the drawings. The vector/matrix arithmetic operation is carried out for the equation shown in FIG. 2, and the same sequence is repeated for producing the product array (x', y', z'), and, for this reason, the description is focused upon the product x' for the sake of simplicity.

All of the operand codes a to i and x to z are assumed to be memorized in the internal register array 1. The central processing unit 32 provides a macro-instruction representative of a vector/matrix arithmetic operation to the command port 4 of the arithmetic processing unit 2 as similar to the prior art data processing system, and the macro-instruction is transferred from the command port 4 to the instruction decoder unit 6, and the instruction decoder unit 6 produces the decoded signal DS representative of the starting address of a micro-program on the basis of the macro-instruction. When the starting address is specified, a sequence of the micro-instruction codes are successively read out from the read only memory unit 8, and are supplied to the controlling unit 10. In accordance with the micro-instruction code sequence, the controlling unit 10 selectively produces the controlling signals 12 for the executions 62 which are supplied to the component units and circuits.

First, the controlling unit 10 shifts the busy signal BUSY to the active low level, which is reported to the central processing unit 32 so that the central processing unit 32 enters the waiting state. The essential part of the micro-instruction codes is illustrated in detail in FIG. 8. The operand code a is transferred to the operand register RG3 as by step MA, and the operand code x is further transferred to the operand register RG4 as by step MB, then the arithmetic and logic unit 18 multiplies the operand code a by the operand code x as by steps MC to MJ to produce the product. The product of the operand codes a and x is transferred from the resultant register RG5 to the operand register RG1 as by step MK.

For producing the product of the operand codes b and y, the operand code b is transferred to the operand register RG3 as by step ML, and the operand code y is further transferred to the operand register RG4 as by step MM. When the multiplicand and the multiplier are stored in the respective operand registers RG3 and RG4, the arithmetic and logic unit 18 multiplies the operand code b by the operand code y as by steps MN to MU to produce the product, and the product of the operand codes b and y are transferred from the resultant register RG5 to the operand register RG2 as by step MV.

Thus, the augend and the addend are provided into the operand registers RG1 and RG2, and the arithmetic and logic unit 18 adds the product of the operand codes b and y to the product of the operand codes a and x to produce the sum as by steps AA to AE. The sum is transferred from the resultant register RG5 to the operand register RG1 again as by step AF.

The operand codes c and z are then transferred to the operand registers RG3 and RG4 as by steps NA and NB, and the arithmetic and logic unit 18 multiplies the operand code by the operand code z to produce the product as by steps NC to NJ. The product of the operand codes c and z is then transferred from the resultant register RG5 to the operand register RG2 as by step NK, and the arithmetic and logic unit 18 adds the addend in the operand register RG2 to the augend in the operand register RG1 as by steps AG to AK to produce the product-sum x'. The sum is given by the following equation (ax+by+cz), and is transferred from the resultant register RG5 to the register x' of the internal register array 16 as by step AL. As will be understood from FIG. 7, the arithmetic processing unit 2 consumes forty five clocks for producing the product-sum x'.

The above mentioned steps MA to AL are repeated to produce the product product-sums y' and z' which are respectively memorized in the registers y' and z'. Since the forty five clocks are consumed to produce each of the product-sums, the arithmetic processing unit 2 consumes a hundred and thirty five clocks for the completion of the vector/matrix arithmetic operation.

Thus, the product-sums x', y' and z' are calculated as instructed, and the micro-instruction code sequence allows the busy signal BUSY to go up to the inactive high level. When the central processing unit acknowledges the completion of the vector/matrix arithmetic operation through the recovery of the busy signal BUSY, the central processing unit 32 requests the status code to the arithmetic processing unit 2, and the status code is analyzed by the central processing unit 32 to see whether or not any exception takes place in the vector/matrix arithmetic operation. If no exception takes place, the product-sums x', y' and z' are transferred to a certain unit, and the data processing unit confirms the completion of the given task.

Since four clocks are needed for the communication between the central processing unit 32 and the arithmetic processing unit 2 for the macro-instruction code and the status code, the total number of the clocks consumed is a hundred and thirty nine. Thus, the data processing system according to the present invention is improved in the time period consumed in the vector/matrix arithmetic operation in comparison with the prior art data processing system.

Figure 8B:
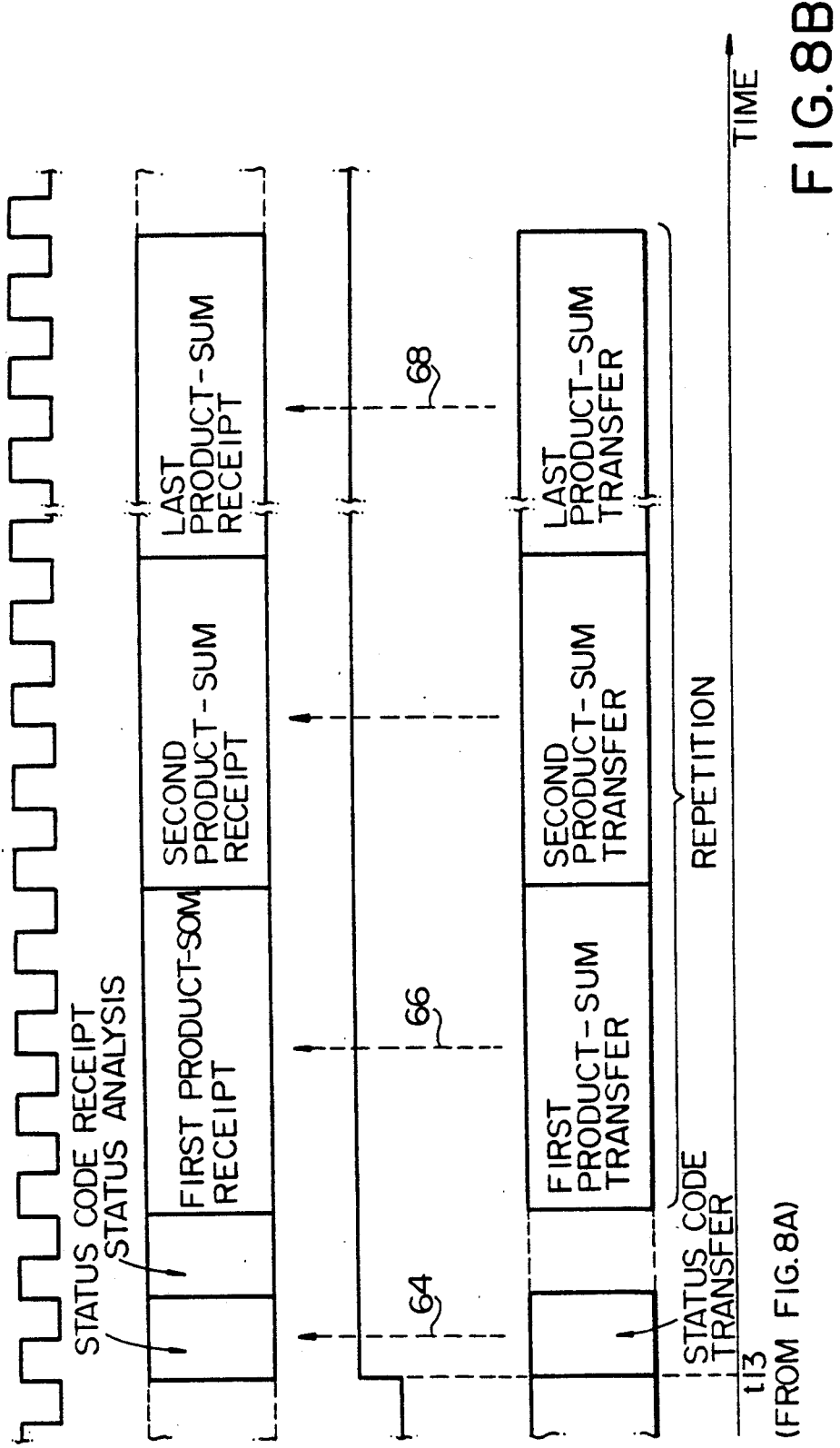

The vector/matrix arithmetic operation is described on the assumption that all of the operand codes have been already memorized in the internal register array 16, however, if no operand code is stored in the arithmetic processing unit 2, the operand codes a to i and x to z are supplied from the outside thereof as illustrated in FIGS. 8A and 8B. Namely, the vector/matrix arithmetic operation starts with the first operand transferring operation 52 of the first operand code from the central processing unit 32 to the arithmetic processing unit 2 at time t10, which is followed by the second operand transferring operation 54. The operand transferring operation is repeated a predetermined number of times for memorizing all of the operand codes a to i and x to z in the internal register array 16 of the arithmetic processing unit 2. Each operand transferring operation needs four clocks.

When the last operand transferring operation 56 is completed (at time t11), the central processing unit 32 transfers the macro-instruction code representative of the vector/matrix arithmetic operation to the arithmetic processing unit 2 as indicated by broken line 58. The macro-instruction code is decoded by the decoder unit 6, and the starting address of the micro-program is specified by the decoded signal DS, then the busy signal BUSY goes down to the active low level at time t12. Thus, the central processing unit 32 is forced to enter the waiting state, and the vector/matrix arithmetic operation is carried out in accordance with the sequence shown in FIG. 7.

When the vector/matrix arithmetic operation is completed, the busy signal BUSY is recovered to the inactive high level at time t13. The central processing unit 32 requests the status code to the arithmetic processing unit 32, and the status code is supplied to the central processing unit 32 as indicated by broken line 64. The central processing unit checks the status code to see whether or not any exception takes place in the vector/matrix arithmetic operation. If no exception takes place, the central processing unit 32 requests the arithmetic processing unit to transfer all of the product-sums x', y' and z'. Then, the arithmetic processing unit 32 successively transfers all of the product-sums to the central processing unit 32 as indicated by broken lines 66 to 68. The successive receiving operation on the operand codes and successive transferring operation on the product-sums are instructed by the central processing unit with macro-instruction codes, and the read only memory unit 8 stores the corresponding microprograms.

Thus, it is necessary for the data processing system to transfer the operand codes as well as the product-sums between the central processing unit 32 and the arithmetic processing unit 2, so that an additional time period is consumed for the transferring operations. For example, if only two operand codes are transferred from the central processing unit 32 to the arithmetic processing unit 2 and only one calculation result is transferred in the opposite direction, the total number of the additional clocks are twelve, and, for this reason, sixteen clocks are consumed for the communication between the central processing unit 32 and the arithmetic processing unit 2.

However, if the vector/matrix arithmetic operation is carried on a 3×3 matrix and a vector with three scalar numbers, the additional time period is calculated as 4 (clocks) × 15 (times) = 60

The total number of the clocks for the communication is 64.

If the prior art data processing unit carries out the arithmetic operation on the 3×3 matrix and the vector with three scalar numbers, the arithmetic processing unit performs nine multiplying operations and six adding operations. The total number of the clocks consumed for each multiplying operation is calculated as 11 (clocks for the calculation) + 16 (clocks for the communication) = 27 (clocks)

The total number of the clocks consumed for each adding operation is given as 8 (clocks for the calculation) + 16 (clocks for the communication) = 24 (clocks)

Then, the total number of the clocks consumed for the task is calculated as 27 (clocks) × 9 (times) + 24 (clocks) × 6 (times) = 387 (clocks)

On the other hand, the data processing system according to the present invention consumes only 199 clocks for completion of the same task as follows:

135 (clocks for the calculation) + 64 (clocks for the communication) = 199 (clocks)

Thus, time consumption of the data processing system according to the present invention is decreased to a half of that consumed by the prior art data processing system, and, for this reason, the built-in microprograms are effective for improvement in the operation speed.

As will be understood from the foregoing description, the data processing system is improved in the operation speed, because the arithmetic operation on the vector and the matrix is carried out without any interrupt for operand receipt.

The macro-instruction code is representative of the arithmetic operation on the vector and the matrix, however, another macro-instruction code is representative of an arithmetic operation on a plurality of vectors, and still another macro-instruction code is representative of an arithmetic operation on a plurality of matrices.

Figure 9:
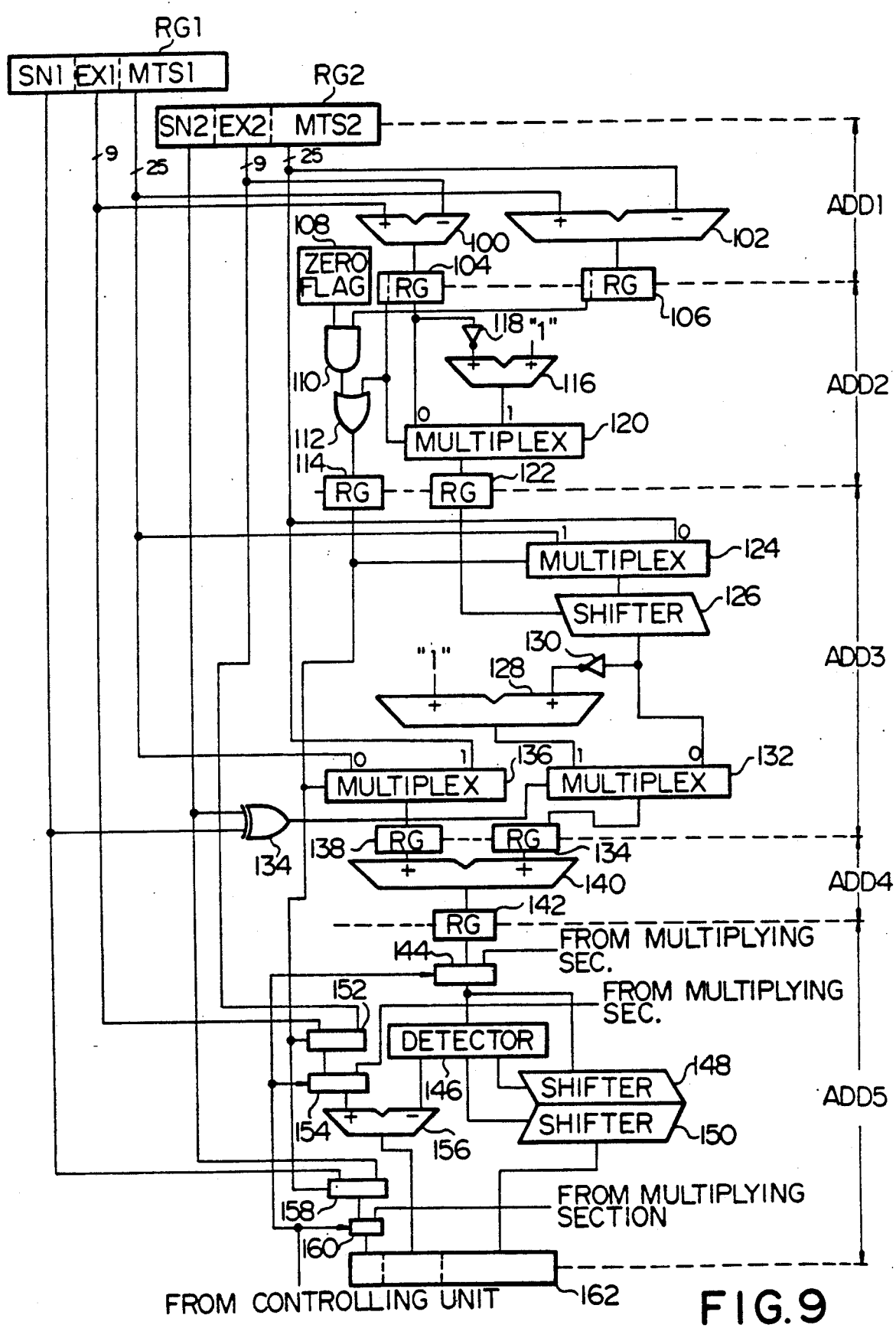
FIG. 9 is a block diagram showing the circuit arrangement of an essential part of the arithmetic and logic unit incorporated in the arithmetic processing unit shown in FIG. 3.
Figure 10:
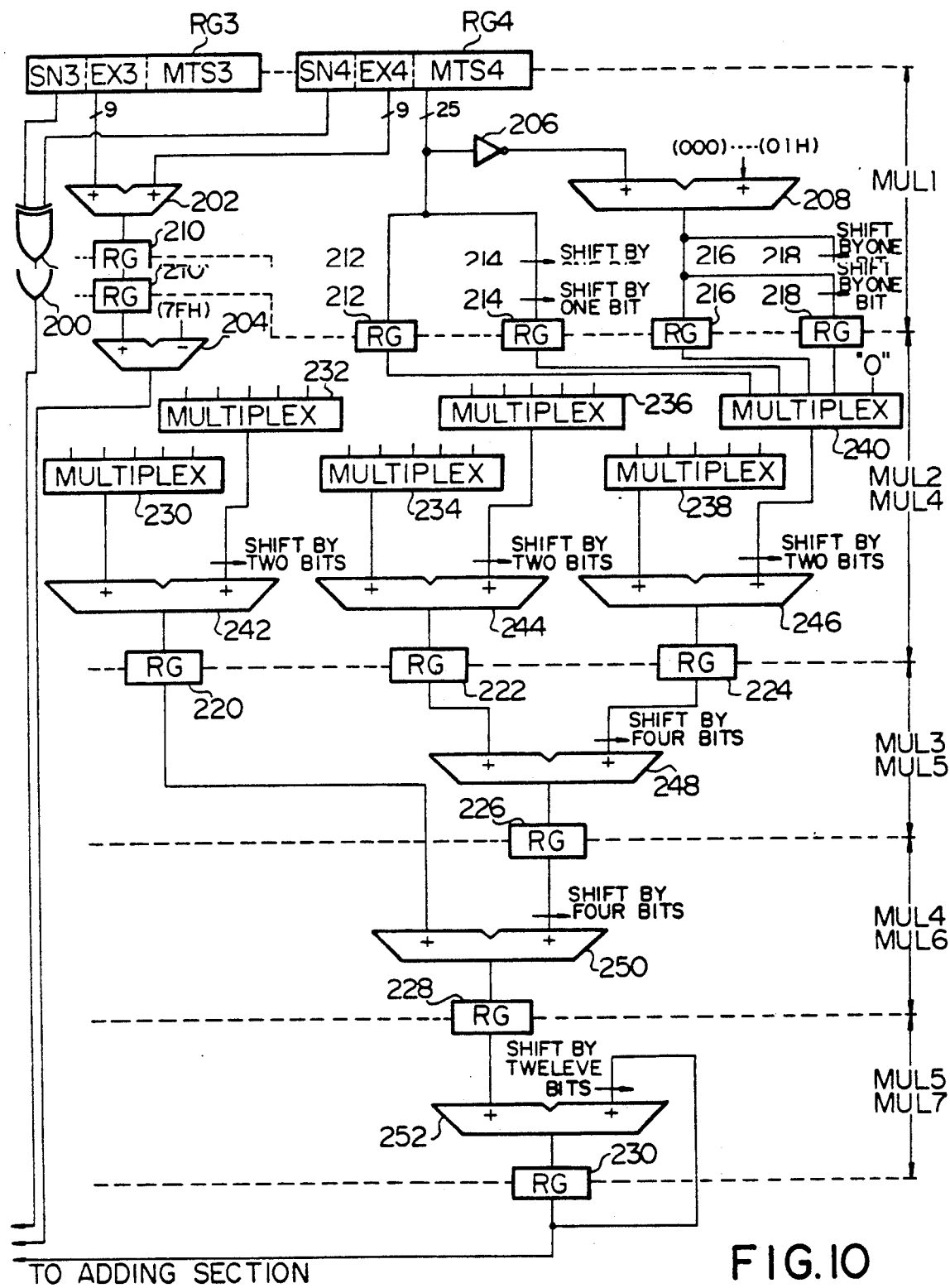
FIG. 10 is a block diagram showing the circuit arrangement of another essential part of the arithmetic and logic unit incorporated in the arithmetic processing unit shown in FIG. 3.

Turning to FIGS. 9 and 10 of the drawings, essential parts of the arithmetic and logic unit 18 are illustrated in detail. The essential part shown in FIG. 9 carries out the adding operation, and another essential part shown in FIG. 10 performs the multiplying operation.

The operand register RG1 has a single sign bit SN1, eight exponential bits EX1 and twenty three mantissa bits MTS1, and thirty two bits of the operand register RG2 are shared by the sign, the exponent and mantissa SN2, EX2 and MTS2 as similar to the operand register RG1. Each of the operand registers RG1 and RG2 thus arranged is capable of providing storage for a number represented in the single precision floating point format according to the IEEE 754 standard. When each of the exponent bits EX1 and EX2 is read out from the operand register RG1 or RG2, a bit of "0" is automatically added next to the highest order bit thereof. According to the IEEE 754 standard, the most significant bit indicative of "1" is deleted from the mantissa bits as the hidden bit, and, for this reason, the bit of "1" is placed on the next to the highest order bit. However, a bit of "0" is further placed next to the bit of "1" upon reading out from the operand register RG1 or RG2, so that the mantissa read out from the operand register RG1 or RG2 is represented by twenty five bits. The exponential bits EX1 and EX2 are supplied to a subtracter 100, and the subtracter 100 produces a difference represented by nine bits. The mantissa bits MTS1 and MTS2 each represented by twenty five bits are fed to a subtracter 102, and a difference produced therein is also represented by twenty five bits. The differences are memorized into a nine-bit register 104 and a twenty five bit register 106, respectively.

Reference numeral 108 designates a zero flag register, and the zero flag is ANDed with the highest order bit of the difference memorized in the register 106. The output of the AND gate 110 is ORed with the highest order bit of the difference memorized in the register 104, and the output of the OR gate 112 is supplied to a flag register 114 for memorizing a comparative result. The binary number indicative of the difference is supplied to an incrementer 116 through an inverter 118, and the outputs of the incrementer 116 and the register 104 are fed to the a multiplexer 120, and the multiplexer 120 is responsive to the highest order bit for steering the outputs. The output of the multiplexer 122 is memorized in a nine bit register 122.

The mantissa bits MTS1 and MTS2 are fed to a multiplexer 124, and the multiplexer 124 is responsive to comparative result in the flag register 114 for selectively transferring to a barrel shifter 126. The barrel shifter 126 is responsive to the output of the register 122, and the mantissa bits in the barrel shifter 126 is shifted in the right direction by a number indicated by the output of the register 122. The output of the barrel shifter 126 is supplied to an incrementer 128 through an inverter 130, and is further supplied to a multiplexer 132. The sign bits SN1 and SN2 are fed to an exclusive- OR gate 134, and the multiplexer 132 is responsive to the output of the exclusive-OR, gate 134 for selectively transferring to a twenty five bit register 134. The mantissa bits MTS1 and MTS2 are supplied to a multiplexer 136, and the output of the register 114 steers the multiplexer 136 for transferring one of the mantissa bits MTS1 and MTS2 to a twenty five bit register 138.

The outputs of the registers 134 and 138 are supplied to an adder 140, and the sum is memorized into a twenty five bit register 142.

The output of the register 142 is fed to a multiplexer 144, and the multiplexer 144 selectively transfers the output of the register 142 or an output from the multiplying section (shown in FIG. 10) to a detector 146. The detector counts the bits of "0" from the highest order side, and detects the first bit of "1" in the bit string supplied from the multiplexer 144. If the data bits in the register 142 is represented by one of the strings shown in the leftmost column of FIG. 11, the data in the other columns are fed to the shifters 148 and 150 and a subtracter 156, respectively. In FIG. 11, the mark x represents either "1" or "0" bit, and the data bits in the register 142 represent a binary number. However, the data fed to the shifter 150 and the subtracter 156 are represented by hexadecimal numbers, respectively. The exponential bits EX1 and EX2 are supplied to a multiplexer 152, and one of the exponential bits EX1 and EX2 is transferred to a multiplexer 154 depending upon the output of the register 114. The multiplexer 154 is responsive to one of the controlling signals 12, and either output from the multiplexer 152 or the multiplying section is transferred to a subtracter 156. The outputs of the detector 146 are supplied to shifters 148 and 150, respectively, in accordance with FIG. 11. The shifter 148 shifts the twenty five bits fed from the multiplexer 144 by a single bit in the right direction in the presence of the data bit of "1" fed from the detector 146. On the other hand, the shifter 150 is of the barrel shifter, and shifts the twenty five bits fed from the shifter 148 by a predetermined number of bits in the left direction depending upon the data bits fed from the detector 146. The subtracter 156 subtracts a value represented by the data bits from the detector 146 from the value represented by the data bits fed from the multiplexer 154. A multiplexer 158 is supplied with the sign bits SN1 and SN2, and is responsive to the output of the register 114 for transferring one of the sign bits SN1 and SN2 to a multiplexer 160. The multiplexer 160 is responsive to aforesaid controlling signal, and transfers one of the sign bit from the multiplexer 158 and a sign bit from the multiplying section to the resultant register RG5. The resultant register RG5 provides a storage for the sign bit, the exponential bits fed from the subtracter 156 and the mantissa bits fed from the shifter 150.

As described hereinbefore, the micro-instruction codes ADD1 to ADD5 are executed to achieve the adding operation, and the micro-instruction codes ADD1 to ADD5 are respectively related to the behaviors in the sections indicated by ADD1 to ADD5. For better understanding of the circuit behaviors, description is made for the circuit behaviors achieved by execution of the micro-instruction codes ADD1 to ADD5.

When the micro-instruction code ADD1 is decoded by the controlling unit 10 to produce a part of the controlling signals, the subtracter 100 subtracts the value represented by the exponential bits EX2 from the value represented by the exponential bits EX1, and the difference is memorized in the register 104. If the difference has a negative value, the most significant bit in the register 104 is "1". However, when the subtracter 100 produces zero, the zero flag is set in the register 108 so as to indicate no difference. Similarly, the subtracter 102 subtracts the value represented by the mantissa bits MTS 2 from the value indicated by the mantissa bits MTS1, and the difference is memorized in the register 106. If the difference is a negative value, the most significant bit in the register 106 is "1". Thus, the operand OPA1 in the form of the floating point number is compared with the operand OPA2 also in the form of the floating point number in the execution of the micro-instruction code ADD1.

When the second micro-instruction code ADD2 is decoded, a second part of the controlling signals allows the zero flag to be anded with the most significant bit in the register 106 and the output of the AND gate 110 to be ORed with the most significant bit in the register 104. The output of the OR gate 112 is memorized in the register 114 as the comparative result flag. The comparative result flag represents that the floating point number in the operand register RG1 is smaller than the floating point number in the operand register RG2. The second part of the controlling signals permits the inverter 118 to produce the complementary bits of the data bits memorized in the register 104, and the incrementer 116 add "1" to the value represented by the complementary bits fed from the inverter 118. If the most significant bit in the register 104 is "0", the multiplexer 120 is transparent to the output of the register 104, however, if, on the other hand, the most significant bit is "1", the multiplexer 120 transfers the output of the incrementer 116 to the register 122. Then, the data bits stored in the register 122 is indicative of the absolute value of the number indicated by the data bits in the register 104. The value indicated by the data bits in the register 122 is the difference between the exponential bits EX1 and EX2, and, for this reason, the value memorized in the register 122 is used for a scale factor.

The third part of the controlling signals are produced by decoding the third micro-instruction code ADD3, and causes the multiplexer 124 to supply the mantissa bits MTS1 to the barrel shifter 126 in the presence of the comparative result flag of "1" but the mantissa bits MTS2 if the comparative result flag is "0". In other words, the multiplexer 124 provides either mantissa bits with the absolute value smaller than that of the other mantissa bits to the barrel shifter 126. The barrel shifter 126 shifts the bits fed from the multiplexer 124 in the right direction depending upon the value represented by the bits in the register 122, so that the value represented by the bits in the register 122 serves as the scale factor. The output of the barrel shifter 126 is supplied to the inverter 130, and the complementary bits thereof are fed from the barrel shifter 126 to the incrementer 128 for producing the complement on two. The sign bits SN1 is exclusive-ORed with the sign bit SN2, and the output of the exclusive-OR gate 134 controls the multiplexer 132. Namely, if the output of the exclusive-OR gate 134 is "0", the multiplexer 132 is transparent to the output of the barrel shifter 126, but the multiplexer 132 allows the complement on two to pass therethrough with the output of the exclusive-OR gate 134 of "1". This results in that the mantissa bits with the smaller absolute value is supplied to the register 134 in the co-presence of the identical sign bits SN1 and SN2, however, if the sign bits SN1 and SN2 are different from each other, the register 134 memorizes the twos complement of the mantissa bits with the smaller absolute value. When the comparative result flag is "0", the mantissa bits MTS1 is memorized in the register 138, however, the mantissa bits MTS2 is memorized in the register 138 in the presence of the comparative result flag of "1". Thus, the selection of the mantissa bits by the multiplexer 136 is opposite to the selection by the multiplexer 132, and the register 138 memorizes either mantissa bits with the absolute value larger than that of the other mantissa bits.

The micro-instruction code ADD4 is causative of the fourth part of the controlling signals 12, and the fourth part causes the adder 140 to add the outputs of the registers 134 and 138 to each other. The sum is memorized in the register 142 for the transferring operation.

The micro-instruction code ADD5 is decoded to produce the fifth part of the controlling signals 12 which is used for normalization. Namely, the multiplexer 144 becomes transparent to the output of the register 142, and, for this reason, the sum is transferred to the detector 146. The detector 146 counts the number of the bits of "0" on the higher orders, and detects the first bit of "1". Then, the detector 146 supplies the bit and the bits to the shifter 148, the shifter 150 and the subtracter 156 in accordance with FIG. 11 for which the description has been made hereinbefore. The multiplexer 152 becomes transparent to either exponential bits with the absolute value larger than that of the other exponential bits depending upon the comparative result flag. The multiplexer 154 transfers the output of the multiplexer 152 to the subtracter 156, because the micro-instruction code ADD5 is indicative of the adding operation. The subtracter 156 carries out the subtracting operation on the exponential bits and the bits fed from the detector 146 for the normalization. The output of the subtracter 146 consists of nine bits, however, the lower eight bits are memorized in the exponential part of the resultant register 162, because the most significant bit is temporally added to the bit string for indicating the positive number or the negative number. The shifter 148 shifts the bit string by a single bit in the right direction depending upon the decision of the detector 146 for the normalization. On the other hand, the barrel shifter 150 shifts the bit string fed from the shifter 148 in the left direction depending upon the bits fed from the detector 146 for the normalization. The output of the barrel shifter 150 consists of twenty five bits, but only the twenty three bits are memorized in the mantissa part of the resultant register 162, because the most significant bit is temporally added to the bit string for the representation of the negative or positive number. The bit next to the most significant bit is also deleted from the bit string according to the IEEE 754 standard. The multiplexer 158 is responsive to the comparative result flag, and becomes transparent to either sign bit fed from the operand registers RG1 and RG2. The sign bit SN1 or SN2 is transferred to the multiplexer 160, and the multiplexer 160 in turn transfers the sign bit SN1 or SN2 to the sign part of the resultant register 162, because of the adding operation. Consequently, the sign bit, the exponential bits and the mantissa bits are memorized in the resultant register 162, and the adding operation is thus completed by memorizing the calculation result in the resultant register 162.

The multiplying section shown in FIG. 10 is accompanied with the operand registers RG3 and RG4, and the operand registers RG3 and RG4 memorize sign bits SN3 and SN4, exponential bits EX3 and EX4 and mantissa bits MTS3 and MTS4, respectively. Each of the exponential parts EX3 or EX4 consists of eight bit, but a single bit is added to the bit string upon reading out form the exponential part. Each of the mantissa parts MTS3 or MTS4 consists of twenty three bits, so that each operand is in the form of the single precision floating point format in accordance with the IEEE 7 54 standard. Since the IEEE7 54 standard requests that the most significant bit be deleted from the bit string as a hidden bit, the hidden bit and one more bit are added to the mantissa bits upon reading out from the mantissa part of the operand register RG3 or RG4.

In FIG. 10, reference numeral 200 designates an exclusive-OR gate, and the output of the exclusive-OR gate 200 is representative of the sign of the product. The sign bit is fed from the exclusive-OR gate 200 to the multiplexer 160. Reference numerals 202 and 204 denote respective adders for calculating the exponential parts, and the adders 202 and 204 perform the adding operations on the nine bit data for producing nine bit sums, respectively. An inverter is denoted by reference numeral 206 for producing the complement bits of all the mantissa bits MTS4. Reference numeral 208 designates an incrementer for the twenty five complementary bits, and reference numeral 210 designates a nine bit register. Reference numerals 212, 214, 216, 218, 220, 222, 224, 226 and 228 respectively designate twenty five bit registers, and multiplexers are denoted by reference numerals 230, 232, 234, 236, 238 and 240, respectively. Adders 242, 244, 246, 248, 250 and 252 are provided for the mantissa parts, and respectively carry out adding operations on the twenty five bit data.

The multiplying operation is achieved by execution of the seven micro-instruction codes MUL1 to MUL8, so that the sequence is divided into eight stages. When the first micro-instruction code MUL1 is decoded by the controlling unit 10, the first part of the controlling signals are produced for the multiplying operation. Namely, the first part of the controlling signals is used for the calculations for the sign bits SN3 and SN4 and the exponential bits EX3 and EX4 as well as for the production of multiples of the Booth's multiplication algorithm. In this instance, the second order Booth's multiplication algorithm is employed in the multiplying section. According to the Booth's multiplication algorithm, the multiplier is divided into twelve three-bit sections each overlapped with the adjacent sections by one bit. With the three bit sections, +2 times the multiplicand, +1 time the multiplicand, zero time the multiplicand, −1 time the multiplicand and −2 times the multiplicand are selectively added together for achievement of the multiplication. For this reason, the multiples are previously produced from the operand memorized in the operand register RG4. Then, let us trace the sequence with reference to FIG. 10. First, the sign bits SN3 and SN4 are supplied to the exclusive-OR gate 200, and the output of the exclusive-OR gate indicative of the sign of the product is transferred to the multiplexer 160. The exponential bits EX3 is added to the exponential bits EX4 by the adder 202, and the sum is memorized in the register 210. Since the bit of "0" is previously added to the bit string of the exponential part EX3 or EX4 upon reading out from the operand register RG3 or RG4, no overflow takes place in the adder 202 and, accordingly, the register 210. The mantissa bits MTS4 is inverted by the inverter 206, then the complement bit string is transferred to the incrementer 208. Since the mantissa part MTS4 consists of the original twenty three bits, the hidden bit of "1" and the extension bit of "0", the component bit string also consists of the twenty five bits. The complement bit string is incremented by one, and, for this reason, the output of the incrementer 208 is of the complement on two. The two's complement is memorized in the register 216. The two's complement is shifted by one bit in the right direction, and is, then, memorized in the register 218. This results in that the registers 216 and 218 respectively retain −1 time the value indicated by the mantissa bits MTS4 and −½ time the value indicated by the mantissa bits MTS4. The register 216 provides the mantissa bits MTS4 to the register 212, and mantissa part MTS4 is shifted by one bit in the right, direction. The bit string thus shifted is memorized in the register 214, so that +1 time the value indicated by the mantissa bits MTS4 and +½ time the value indicated by the mantissa bits MTS4 are respectively retained in the registers 212 and 214. The arithmetic shifts are carried out through coupling wires, so that no shifter is provided in association with the registers 212 to 218.

With the second part of the controlling signals produced by decoding the micro-instruction code MUL2, the multiplying section starts the multiplication of the lower twelve bits of the mantissa bits MTS3 and the mantissa bits MTS4. As will be seen from FIG. 12, the mantissa bits MTS3 are divided into twelve sections SEC1, SEC2, SEC3, SEC4, SEC5, SEC6, SEC7, SEC8, SEC9, SEC10, SEC11 and SEC12 which are transferred to the multiplexers 230 to 240. By the way, $m_i$ (where i is 0, . . . . and 22) are component bits of the mantissa part MTS4. The seventh section SEC consisting of the component bits $m_{11}$, $m_{10}$ and $m_9$ is transferred to the multiplexer 230, and the multiplexer 232 is supplied with the eighth section SEC8 consisting of the component bits $m_9$, $m_8$ and $m_7$, the ninth section SEC9 consisting of the component bits $m_7$, $m_6$ and $m_5$ being transferred to the multiplexer 234, the tenth section SEC10 consisting of the component bits $m_5$, $m_4$ and $m_3$ being transferred to the multiplexer 236, the eleventh section SEC11 consisting of the component bits $m_3$, $m_2$ and $m_1$ being transferred to the multiplexer 238, the last section SEC12 consisting of the component bits $m_1$, $m_0$ and an extension bit of "0" being transferred to the multiplexer 240. The sections SEC1 to SEC6 are transferred to the respective multiplexer in the execution of the micro-instruction code MUL4, and the sections SEC 7 to 12 are used in the selections under the micro-instruction code MUL2. Each of the multiplexers 230, 232, 234, 236, 238 or 240 is coupled at the input nodes thereof to the registers 212, 214, 216 and 218, and the bit "0" is also supplied to one of the input nodes. Each of the multiplexers transfers the bits of the selected register or the bit "0" depending upon the bit pattern of the section supplied thereto. Each of the outputs of the multiplexers is shifted by two bits upon transferring to the adder 242, 244 or 246. The outputs of the multiplexers 230 to 240 are added together by the associated adders 242, 246 and 248, respectively, and the sums are respectively memorized in the registers 220, 222 and 224. The subtracter 204 subtracts a constant value (7 FH) from the sum memorized in the register 210, and the constant value (7 FH) is the bias value for the exponential part of the single precision floating point format defined by the IEEE 754 standard. Both of the exponential parts EX3 and EX4 contain the bias value, and the value indicated by the bits in the register 210 contains twice the bias value after the adding operation carried out by the adder 202. In order to normalize the exponential part, the subtracter 810 deletes one of the bias values, and the difference is transferred to the adding section.

When the third micro-instruction code MUL3 is decoded, the third part of the controlling signals 12 allows the bit string read out form the register 224 to be shifted by four bits in the right direction through a coupling wire. The value indicated by the bits memorized in the register 222 is added to the value indicated by the bits in the register 224, and the sum is transferred from the adder 248 to the register 226 for memorization.

The fourth micro-instruction code MUL4 is decoded by the controlling unit 10, and the fourth part of the decoded controlling signals allows the multiplication of the lower twelve bits of the mantissa part MTS3 to be completed and the higher twelve bits to enter the sequence in a pipeline fashion. The bit string memorized in the register 226 is shifted by four bits in the right direction, and the value indicated by the bits thus shifted by four bits is added to the value indicated by the bits in the register 220. The sum is transferred from the adder 250 to the register 228, and is memorized therein. Thus, the lower twelve bits of the mantissa part MTS3 is multiplied by the mantissa part MTS4, and the result is stored in the register 228.

Figure 12:
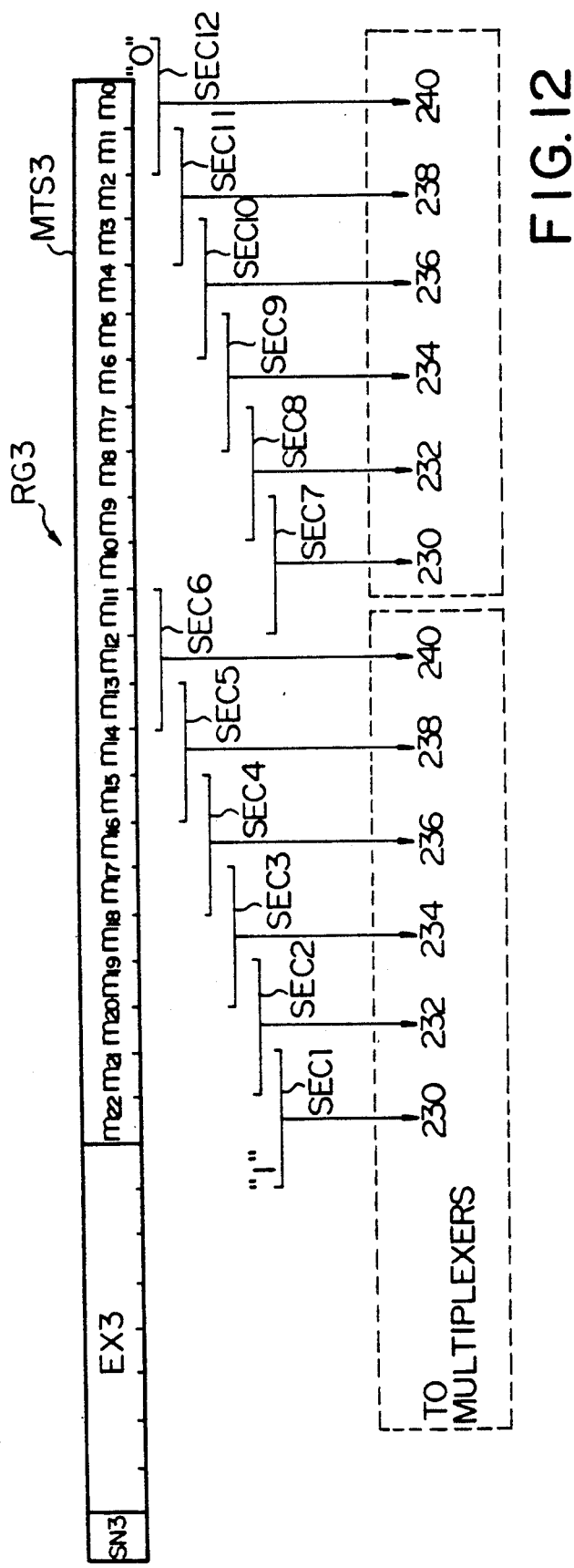
FIG. 12 is a view showing the operand divided into a plurality of sections each overlapped with the adjacent sections by one bit in accordance with the Booth's multiplication algorithm.

Simultaneously, the higher twelve bits of the mantissa MTS3 is treated through the similar sequence controlled upon execution of the micro-instruction code MUL2. Namely, as shown in FIG. 12, the first section SEC1 consisting of an extension bit of "1" and the component bits $m_{22}$ and $m_{21}$ is supplied to the multiplexer 230, and the multiplexer 232 is supplied with the second section SEC2 consisting of the component bits $m_{21}$, $m_{20}$ and $m_{19}$, then the third section SEC3 consisting of the component bits $m_{19}$, $m_{18}$ and $m_{17}$ being transferred to the multiplexer 234, then the fourth section SEC4 consisting of the component bits $m_{17}$, $m_{16}$ and $m_{15}$ being transferred to the multiplexer 236. In the similar manner, the fifth section SEC5 is transferred to the multiplexer 238, and the multiplexer 240 is supplied with the sixth section SEC6. The multiplexer thus supplied with the respective sections SEC1 to SEC6 becomes transparent to one of the bit groups or the bit of "0" depending upon the bit pattern as shown in FIG. 13. Each of the bit strings from the multiplexers 232, 236 and 240 is shifted by two bits through a coupling wiring, and the bit strings fed from the multiplexers 230 to 240 are added by the associated adders 242, 244 and 246, and the sums are memorized in the registers 220, 222 and 224, respectively.

The fifth micro-instruction code MUL5 is also causative of two different behaviors in a pipeline fashion. Namely, the bits in the register 228 are added to the bits in the register 230, and the sum is memorized in the register 230. Since the register 230 initially stores the bit string consisting of the bits of "0", the register 230 memorizes the same bit string upon completion of the first addition. The second behavior is similar to that caused by the third micro-instruction code MUL3. Namely, the bit string in the register 224 is shifted by four bits in the right direction, and the bits thus shifted by four bits are added to the bits in the register 222. The sum is memorized in the register 226.

The sixth micro-instruction code MUL6 is decoded to produce the sixth part of the controlling signals 12. The sixth part of the controlling signals 12 is causative of the behavior for the upper twelve bits of the mantissa bits MST3 similar to that produced by the fourth part of the controlling signals 12. Namely, the bit string in the register 226 is shifted by four bits in the right direction, and the bits thus shifted in the right direction are added to the bits from the register 220. The sum is transferred from the adder 250 to the register 228, and is memorized in the register 228 as the product of the higher twelve bits of the mantissa part MTS3 and the mantissa part MTS4.

When the seventh micro-instruction code MUL7 is decoded by the controlling unit 10, the seventh part of the controlling signals 12 takes place to complete the multiplying operation. Namely, since the register 230 retains the product of the lower twelve bits of the mantissa part MTS3 and the mantissa bits MTS4, the bit string indicative of the product is shifted by twelve bits in the right direction, and, then, the bits thus shifted are added to the bits fed from the register 228 to produce the product of the mantissa parts MTS3 and MTS4. The final product is stored in the register 230.

The final micro-instruction code MUL8 is used for the normalization as similar to the adding operation. Since the multiplying operation is carried out for the normalized numbers, the final product is also normalized number, or the final product be normalized in the right direction by one bit only. This normalization is carried out by the detector 146, the shifter 148 and the subtracter 156. Namely, the multiplexer 144 becomes transparent to the bits from the register 230, and the bits from the register 230 is transferred to the detector 146. The detector 146 counts the number of the bits of "0" from the highest order side, and detects the first bit "1" for producing the bit and bits in accordance with FIG. 11. The bit and the bits are supplied to the shifter 148, the barrel shifter 150 and the subtracter 156. The multiplexer 154 is transparent to the bits from the subtracter 204, because of the multiplying operation, and the difference from the subtracter 204 is transferred to the subtracter 156. The subtracter 156 subtracts the value indicated by the data bits fed from the detector 146 from the difference so as to normalize the exponential part. The normalized exponential part consists of nine bits, but the lower eight bits are memorized in the exponential part of the resultant register 162, because the most significant bit was added for the sake of indicating a positive or negative number. The shifter 148 shifts the bit string in the right direction by one bit, if necessary for the normalization. However, no left shifting is needed, so that the lower twenty three bits pass through the barrel shifter 150 and are memorized in the mantissa part of the resultant register 162. The most significant bit was added to the mantissa bits for indicating a negative or positive number, and, for this reason, the most significant bit is deleted from the bit string. The hidden bit is also deleted from the mantissa bits in accordance with the IEEE 754 standard. The multiplexer 160 transfers the sign bit from the exclusive-OR gate 200 to the sign part of the resultant register 162. Thus, the multiplying operation is completed by the final micro-instruction code MUL8.

Although particular embodiments of the present invention have been shown and described, it will be obvious to those skilled in the art that various changes and modifications may be made without departing from the spirit and scope of the present invention.

What is claimed is:

1. An arithmetic processing unit, coupled to a central processing unit having a plurality of instruction codes including a plurality of macro-instruction codes representative of arithmetic operations executable on scalar numbers, on a vector and a matrix, on a plurality of vectors and on a plurality of matrices, comprising:
   a) a program memory unit storing a plurality of microprograms including microprograms corresponding to said macro-instructions representative of the arithmetic operations;
   b) an instruction decoder unit supplied with one of the macro-instruction codes and producing a decoded signal indicative of a starting address of one of said macroprograms corresponding to said one of the macro-instructions for successively reading out a micro-instruction code sequence from said program memory;
   c) a controlling unit responsive to the micro-instruction code sequence and operative to produce a plurality of controlling signals and to shift a busy signal between an active level and an inactive level so as to cause the central processing unit to enter a waiting state and to be recovered therefrom;
   d) an internal register array having a plurality of registers for memorizing a plurality of operand codes, sums, products and product-sums;
   e) a resultant register for storing one of said sums of said operand codes, one of said products of said operand codes and one of said product-sums;
   f) a plurality of operand registers partially assigned to said operand codes serving as an augend and an addend and partially assigned to said operand codes serving as a multiplicand and a multiplier;
   g) an arithmetic and logic unit responsive to said controlling signals and operative to perform at least arithmetic operations on the operand codes in said operand registers for producing one of said sums, one of said products and one of said product-sums in said resultant register; and
   h) a data input-and-output port communicable with external units including said central processing unit for receiving said operand codes and for transferring one of said sums, one of said products and said product-sums.

2. An arithmetic processing unit as set forth in claim 1, in which one of said microprograms is used for successively producing two products of two pairs of said operand codes, then adding said two products for producing a product-sum.

3. A data processing system comprising
   a) a central processing unit having a plurality of instruction codes including a plurality of macro-instruction codes respectively representative of arithmetic operations on scalar numbers, on a vector and a matrix, on a plurality of vectors and on a plurality of matrices, said central processing unit further having a plurality of operand codes and macro-instructions for requesting a successive receiving operation on said operands and successive transferring operation on at least product-sums; and
   b) an arithmetic processing unit comprising
      b-1) a program memory unit storing a plurality of microprograms including microprograms corresponding to said macro-instructions representative of the arithmetic operations and micro-programs for said successive receiving operation and said successive transferring operation,
      b-2) an instruction decoder unit supplied with one of the macro-instruction codes and producing a decoded signal indicative of a starting address of one of said microprograms corresponding to said one of the macro-instructions for successively reading out a micro-instruction code sequence from said program memory, b-3) a controlling unit responsive to the micro-instruction code sequence and operative to produce a plurality of controlling signals and to shift a busy signal between an active level and an inactive level so as to cause the central processing unit to enter a waiting state and to be recovered therefrom, b-4) an internal register array having a plurality of registers for memorizing said operand codes, sums, products and said product-sums, b-5) a resultant register for storing one of said sums of said operand codes, one of said products of said operand codes and one of said product-sums, b-6) a plurality of operand registers partially assigned to said operand codes serving as an augend and an addend and partially assigned to said operand codes serving as a multiplicand and a multiplier, b-7) an arithmetic and logic unit responsive to said controlling signals and operative to perform at least arithmetic operations on the operand codes in said operand registers for producing said one of said sums, said one of said products and said one of said product-sums in said resultant register, and b-8) a data input-and-output port responsive to said controlling signals and communicable with said central processing unit for successively receiving said operand codes an for successively transferring said product-sums, said data input-and-output port further operative to transfer one of said sums and one of said products.

4. A data processing system as set forth in claim 3, in which said data processing system further comprises a memory unit coupled to said central processing unit and said arithmetic processing unit through an external bus system.

5. A data processing system as set forth in claim 3, in which one of said microprograms is used for successively producing two products of two pairs of said operand codes, then adding said two products for producing a product-sum.

6. A data processing system comprising a) a central processing unit having a plurality of macro-instruction codes including macro-instruction codes representative of arithmetic operations executable on scalar numbers, on a vector and a matrix, on a plurality of vectors and on a plurality of matrices, and b) a co-processing unit coupled to and for receiving said macro-instructions from said central processing unit, said co-processing unit having a plurality of micro-instruction sets corresponding to the macro-instructions for performing said arithmetic operations, in which said co-processing unit comprises operand registers and a resultant register, said operand registers including first and second operand registers respectively assigned to an addend and an augend used to generate a sum, third and fourth operand registers respectively assigned to a multiplier and a multiplicand used to generate a product, said resultant register storing said sum or said product, said resultant register being operative to transfer the sum to said second operand register when one of said micro-instruction sets instructs said resultant register to couple said second operand register, said resultant register being further operative to transfer said product to said fourth operand register when another micro-instruction set instructs said resultant register to couple said fourth operand register.

* * * * *

UNITED STATES PATENT AND TRADEMARK OFFICE
CERTIFICATE OF CORRECTION

PATENT NO. : 5,038,312
DATED : August 6, 1991
INVENTOR(S) : Shingo Kojima

It is certified that error appears in the above-identified patent and that said Letters Patent is hereby corrected as shown below:

Col. 7, line 58 after the first occurrence of "code", insert --c--.

Col. 14, line 4 delete "form" and insert --from--.

Col. 14, line 7 delete "7 54" and insert --754--.

Col. 14, line 8 delete "IEEE7 54" and insert --IEEE 754--.

Col. 15, line 11 delete "-1/4" and insert -- -1/2--.

Col. 15, line 17 delete "+1/4" and insert --+1/2--.

Col. 16, line 7 delete "form" and insert --from--.

Signed and Sealed this

Twenty-fifth Day of May, 1993

MICHAEL K. KIRK

*Attest:*

*Attesting Officer*  *Acting Commissioner of Patents and Trademarks*